United States Patent [19]

Narisawa et al.

[11] Patent Number: 4,541,331

[45] Date of Patent: Sep. 17, 1985

[54] APPARATUS FOR ROUTERING TUBEROUS SPROUTS

[76] Inventors: Hirokichi Narisawa, Minamishimoura-machi, Miura-shi, Kanagawa-ken; Tatsuo Nagaoka, Kohoku-ku, Yokohama-shi, Kanagawa-ken, both of Japan

[21] Appl. No.: 617,937

[22] Filed: Jun. 6, 1984

[30] Foreign Application Priority Data

Jun. 7, 1983 [JP] Japan ................. 58-100192

[51] Int. Cl.⁴ ........................................... A23N 15/00
[52] U.S. Cl. ..................................... 99/567; 99/537; 99/584
[58] Field of Search ............... 99/485, 486, 489, 491, 99/537–539, 567, 584, 588–593, 594–599, 646 R; 426/481–483

[56] References Cited

U.S. PATENT DOCUMENTS 3,237,664 3/1966 Macy et al. .................. 99/489 X
3,881,406 5/1975 Perez ............................ 99/597 X

FOREIGN PATENT DOCUMENTS 2605682 2/1976 Fed. Rep. of Germany ........ 99/537

Primary Examiner—Timothy F. Simone
Attorney, Agent, or Firm—Lowe, King, Price & Becker

[57] ABSTRACT

An apparatus for routering sprouts of a tuber such as a potato has: a drill-like blade having a distal end with a tapered portion; a blade motor for rotating the drill-like blade; a drilling unit having a feeding unit for reciprocally feeding the drill-like blade; a rotating member mounted with a hydropneumatic cylinder having clamping members for clamping the tuber therebetween; and a tuber motor for rotating the rotating member.

12 Claims, 10 Drawing Figures

APPARATUS FOR ROUTERING TUBEROUS SPROUTS

BACKGROUND OF THE INVENTION

The present invention relates to an apparatus for routering tuberous sprouts. Tubers such as potatoes and sweet potatoes are widely used as typical cooking materials. The sprouts of tubers must be cut out and their skins must be peeled before the tubers are actually cooked. When a large amount of tubers are to be cooked, sprouts and skins must be mechanically removed.

Conventionally, the sprouts of the tubers are cut out or routered by a cooking knife or a flat blade 1 with a router, as shown in FIG. 1. The sprouts are manually cut and then gouged out in a conical shape. According to this manual method, two types of blades must be used: one is a blade for cutting the extended portions of the sprouts; and the other is a blade for routering the inner portions of the sprouts. Since the sprouts of the potatoes are toxic, the sprouts must be completely routered. Furthermore, since there are a plurality of sprouts in each potato, and the sprout portions are recessed, they must be manually routered one by one, resulting in a time-consuming and cumbersome operation. In addition to this disadvantage, since the sprouts are routered in a conical shape, edible portions are routered together with the sprouts, thus wasting good cooking material. Furthermore, since the potato has a three-dimensional surface, skill is required to peel the skin and remove the sprouts. Unskilled cooks may hurt themselves.

A conventional sprout routering apparatus is described in Japanese Utility Model Publication No. 47-795. In this apparatus, a cutter with a tapered head is detachably mounted on a rotating shaft of an electric motor horizontally mounted on an upper portion of a frame of the apparatus. A water supply pipe is disposed above the head of the cutter to be opened by a valve upon operation of a pedal disposed at one side of the frame. A water drain pipe which communicates with the outside of the apparatus is connected to a drain water reservoir disposed below the cutter. A net basket is detachably disposed in the reservoir to collect the peelings of the skin and sprouts. According to the apparatus described above, an operator grasps a potato and urges the sprout against the cutter, so that skill and labor are required, and the operator may be hurt by the cutter.

SUMMARY OF THE INVENTION

It is a first object of the present invention to overcome the above drawbacks and to provide an apparatus for routering tuberous sprouts, wherein the sprouts of the tubers can be efficiently routered with less labor, skill is not required, the operator cannot hurt himself, and a large amount of tubers can be prepared for cooking.

It is a second object of the present invention to provide an apparatus for routering tuberous sprouts, wherein a drill-like blade having a tapered portion at its distal end is manually or automatically fed by a feeding unit driven by a motor, and a sprout of the tuber is removed by a predetermined cut amount so as to decrease a loss of edible portions.

It is a third object of the present invention to provide an apparatus for routering tuberous sprouts, wherein a drilling unit is moved on an arcuated path along the outer skin of a tuber.

It is a fourth object of the present invention to provide an apparatus for routering tuberous sprouts, wherein the apparatus has a drilling unit with a sprout detector made of a photosensor, and relative movement of the tuberous skin surface perpendicular to the axis of the sprout detector is stopped when the sprout detector detects a sprout.

It is a fifth object of the present invention to provide an apparatus for routering tuberous sprouts, wherein the arcuated movement of the drilling unit is automatically reversed in its direction upon reaching an end of the arcuated path.

In order to achieve the above objects of the present invention, there is provided an apparatus for routering tuberous sprouts, comprising: a drill-like blade having a distal end with a tapered portion; a blade motor for rotating said drill-like blade; a drilling unit having a feeding unit for reciprocating said drill-like blade; a rotating member having a hydropneumatic cylinder with clamping members for clamping a tuber; and a holding member having a tuber motor for rotating said rotating member, said feeding unit being provided with a handle or a screw rod having a screw rod motor and a moving member which is screwed around said screw rod and which has said drill-like member thereon, said drilling unit being provided with an arcuated guide rail along a surface of the tuber, a sprout detector made of a photosensor for supplying a control signal to said tuber motor, a cut amount detector and a feed unit motor for feeding said feeding unit along said guide rail, said guide rail being provided with a switch at one end thereof, and said cut amount detector being connected to said feeding unit motor so as to rotate said feeding unit motor in a reverse direction in response to a detection signal from said cut amount detector.

DETAILED DESCRIPTION OF THE PREFERRED EMBODIMENTS

Figure 1:
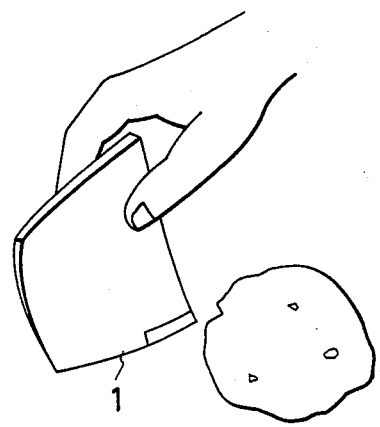
FIG. 1 is a perspective view showing a conventional sprout routering operation.
Figure 2:
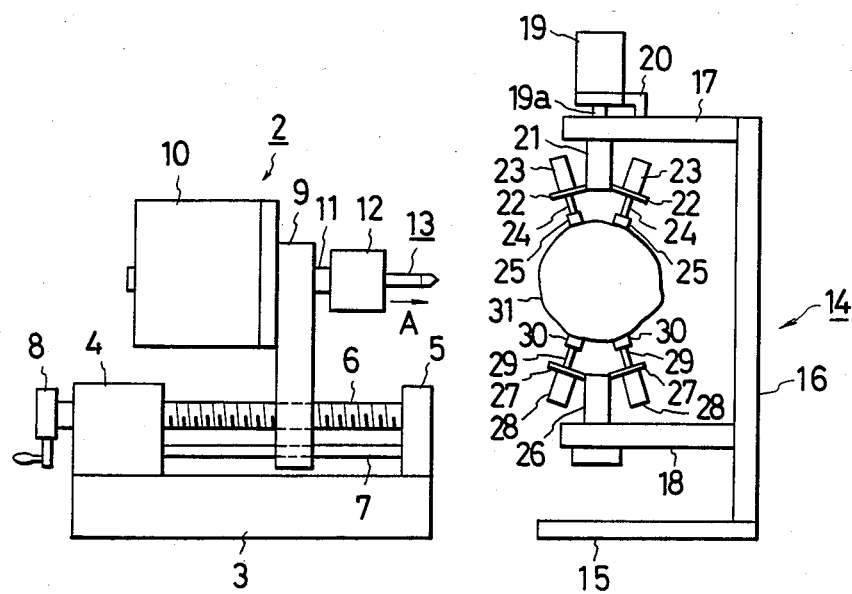
FIG. 2 is a front view of an apparatus for routering tuberous sprouts according to a first embodiment of the present invention.

A first embodiment of the present invention will be described in detail with reference to the accompanying drawings. Referring to FIG. 2, reference numeral 3 denotes a base of the apparatus. The base 3 serves as a table of a drilling unit 2 for routering the sprouts of potatoes. A support 4 is placed on one end of the base 3, and a support 5 is placed on the other end of the base 3. A screw rod 6 having a male threaded portion thereon is rotatably mounted between the supports 4 and 5 through bearings. A guide frame 7 is disposed below the screw rod 6 to be parallel therewith. A handle 8 is integrally mounted on one end of the screw rod 6.

Reference numeral 9 denotes a moving member which has a lower portion screwed around the screw rod 6 and a lowest portion fitted around the guide frame 7. A motor 10 is fixed at one side of the upper portion of the moving member 9. A chuck 12 is mounted on a motor shaft 11 of the motor 10. A drill-like blade 13 is mounted on the chuck 12 to router the sprout portions of the potatoes. When the operator turns the handle 8, the moving member 9 is moved along the screw rod 6 in the direction indicated by arrow A guided by the guide frame 7.

Reference numeral 14 denotes a holding unit to hold a tuber, such as a potato. An elongated vertical stand 16 is mounted on a mounting base 15. An upper support 17 is coupled to the upper end of the stand 16 and extends horizontally therefrom. A lower support 18 is coupled at a lower portion of the stand 16 to extend parallel to the upper support 17. A driving motor 19 is mounted on the upper support 17 through a mounting member 20. An upper end of an upper rotating member 21 is mounted on a lower end of a motor shaft 19a of the driving motor 19 through a bearing. Fixing plates 22 are fixed at the lower end of the upper rotating member 21. Hydropneumatic cylinders 23 such as hydraulic or pneumatic cylinders are mounted on the fixing plates 22, respectively. Clamping members 25 are mounted on the distal ends of piston rods 24 of the cylinders 23, respectively.

A lower rotating member 26 extends from the lower support 18 through a bearing so as to be coaxial with the upper rotating member 21. Fixing plates 27 are mounted on the upper end of the lower rotating member 26. Hydropneumatic cylinders 28 are mounted on the fixing plates 27, respectively. Clamping members 30 are mounted on the distal ends of piston rods 29 of the cylinders 28, respectively. A potato 31 is firmly clamped between the clamping members 25 and 30 upon actuation of the cylinders 23 and 28.

Figure 3:
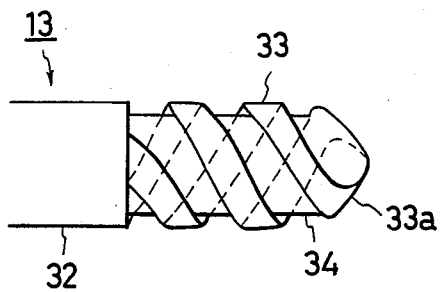
FIG. 3 is a side view of a routering blade used in the apparatus shown in FIG. 2.
Figure 4:
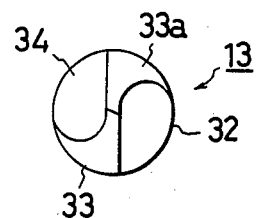
FIG. 4 is a front view of the routering blade shown in FIG. 3.

The drill-like blade 13 has a cylindrical portion 32 held by the chuck 12. A cylindrical routering blade 33 is formed at the distal end of the portion 32, as shown in FIGS. 3 and 4. The cylindrical routering blade 33 has a tapered portion 33a at its distal end. A helical flute 34 is formed in the routering blade 33 to exhaust the sprout chips.

The operation of the apparatus of the first embodiment will be described. The potato 31 is vertically clamped by the cylinders 23 and 28 between the clamping members 25 and 30. At the same time, the potato 31 is rotated coaxially with vertical shaft of the driving motor 19.

When the motor 10 is rotated at, for example, 1,200 rpm the drill-like blade 13 mounted on the chuck 12 is also rotated at 1,200 rpm. The potato 31 is stopped such that a sprout is aligned with the axis of the drill-like blade 13 by visual observation. The operator rotates the handle 8 by hand to rotate the screw rod 6, so that the moving member 9 is moved by the screw rod 6 along the guide frame 7 (in the direction indicated by arrow A). The distal end of the drill-like blade 13 is brought into contact with the sprout of the potato 31. The operator further turns the handle 8 to an extent that the sprout is completely routered. Therefore, without wasting the edible portion of the potato 31 and without heating the drill 12, the sprout is effectively routered along the flute 34 of the routering blade 33. As a result, a portion of the potato which corresponds to the sprout is drilled by the drill-like blade 13 in a cylindrical shape. The operator then withdraws blade 13 by turning handle 8.

Subsequently, the driving motor 19 is rotated, the next sprout of the potato 31 is aligned with the axis of the drill-like blade 13, and the same operation as described above is performed to remove all the sprouts of the potato 31 along a given peripheral surface portion.

When all the sprouts of the potato 31 along the given peripheral surface portion are removed, the cylinders 23 are actuated to change the clamping position of the potato 31, and the same operation as described above is repeated.

When sprout routering is repeated, all the sprouts on the entire surface of the potato are removed.

Figure 5:
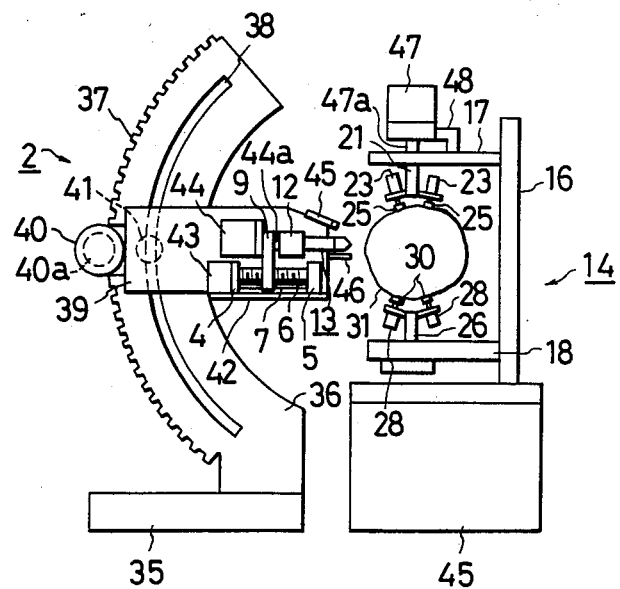
FIG. 5 is a front view of an apparatus for routering tuberous sprouts according to a second embodiment of the present invention.

FIG. 5 shows an apparatus for routering tuberous sprouts according to a second embodiment of the present invention. In a drilling unit 2, a vertical arcuated guide rail main body 36 is mounted on a base 35. An arcuated gear 37 is formed on the outer periphery of the guide rail main body 36. A guide groove 38 is formed inside the guide rail main body 36.

Reference numeral 39 (FIG. 5) denotes a fixing board. A fixing board moving motor 40 having a gear 40a meshed with the arcuated gear 37 is mounted on the fixing board 39. The fixing board 39 has an engaging member 41 which engages with the guide groove 38. A blade table 42 is mounted at the lower portion of the fixing board 39. Supports 4 and 5 are mounted on the blade table 42 and are spaced apart from each other by a predetermined interval. A screw rod 6 is rotatably mounted between the supports 4 and 5 through bearings, respectively. A feed motor 43 is mounted on the screw rod 6. A guide frame 7 is disposed below the screw rod 6 and is parallel thereto.

A blade rotating motor 44 is mounted on a moving member 9 which is fitted around the guide frame 7 and which is screwed around the screw rod 6. Feed motor 43 can rotate screw rod 6 so as to advance or retract moving member 9 guided along guide frame 7. A chuck 12 is mounted on a motor shaft 44a of the blade rotating motor 44. A drill-like blade 13 is mounted on the chuck 12 to be directed toward the center of the potato 31. Reference numeral 45 denotes a photosensor for detecting a sprout of the potato 31. The fixing board 39 is driven in an arcuated manner along the guide groove 38 since a gear 40a meshed with the arcuated gear 37 is rotated upon rotation of the motor 40. Reference numeral 46 denotes a cut amount detector for detecting a cut depth of the drill-like blade 13.

In a holding unit 14, an elongated vertical stand 16 is mounted on a mounting base 15 in the same manner as in the first embodiment. Upper and lower supports 17 and 18 extend horizontally from upper and lower portions of the stand 16. A tuber rotating stepping motor 47 is mounted on the upper support 17 through a mounting tool 48. An upper rotating member 21 is mounted on a motor shaft 47a of the stepping motor 47. Hydropneumatic cylinders 23 are mounted on fixing plates 22 at the lower end of the upper rotating member 21.

A lower rotating member 26 is mounted on the lower support 18 through a bearing and is coaxial with the upper rotating member 21. Hydropneumatic cylinders 28 are mounted on fixing plates 27 at the upper end of the lower rotating member 26. Clamping members 25 and 30 vertically clamp the potato 31 upon actuation of the cylinders 23 and 28.

The operation of the apparatus according to the second embodiment of the present invention will be described hereinafter, with reference to FIG. 5. The fixing board 39 is located at an end of the guide rail main body 36. The fixing board moving motor 40 and the tuber rotating stepping motor 47 are driven while the potato 31 is vertically clamped by the clamping members 25 and 30 upon actuation of the cylinders 23 and 28.

When the fixing board moving motor 40 is rotated, the gear 40a is moved slowly along the arcuated gear 37, and the fixing board 39 is moved very slowly along the guide groove 38. When the tuber rotating stepping motor 47 is driven, the potato 31 vertically clamped by the clamping members 25 and 30 by means of the cylinders 23 and 28 is rotated about the vertical axis. The photosensor 45 helically scans the surface of the potato 31 at a constant speed so as to detect a change in light reflected by a sprout of the potato.

When the photosensor 45 detects a sprout on the surface of the potato 31, the fixing board moving motor 40 and the tuber rotating stepping motor 47 are simultaneously stopped. The feed motor 43 is actuated to rotate the screw rod 6. The moving member 9 and the drill-like blade 13 are simultaneously moved forward. When the cut amount detector 46 is brought into contact with the surface of the potato 31, the blade rotating motor 44 is driven to rotate the drill-like blade 13, so that the sprout of the potato 31 is drilled to a predetermined depth.

When an output from the cut amount detector 46 has reached the predetermined depth, and the sprout is completely removed, the blade rotating motor 44 is stopped, and the feed motor 43 is rotated in the reverse direction to withdraw the drill-like blade 13 to the initial position. The fixing board moving motor 40 is driven to move the fixing board 39 further along the guide groove 38 since the gear 40a is moved along the arcuated gear 37. The potato 31 is rotated by tuber rotating stepping motor 47, and the next sprout is detected by the photosensor 45. This sprout is also removed by the drill-like blade 13. Subsequently, the potato 31 clamped by the clamping members 25 and 30 is released upon release of the cylinders 23 and 28 and is slightly moved. Thereafter, the potato 31 is clamped again by the clamping members 25 and 30, and another sprout is detected and routered in the same manner as described above.

When the same operation described above is repeated, all the sprouts of the potato are routered.

Figure 6:
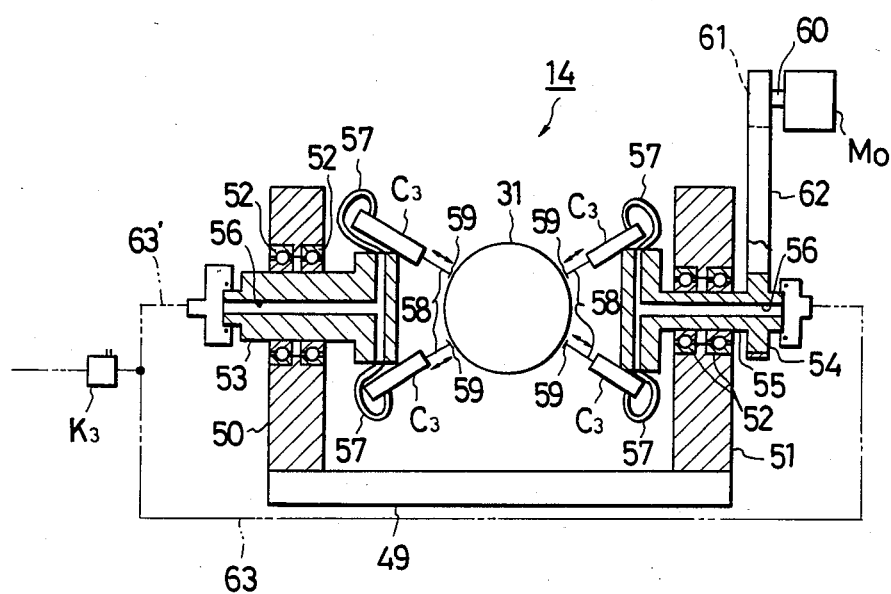
FIG. 6 is a front view showing a section of a main part of a holding unit according to a third embodiment of the present invention.

FIGS. 6 to 10 show a third embodiment of the present invention. The apparatus of the third embodiment is of a transverse type, while the apparatus of the second embodiment is of a vertical type. Referring to FIG. 6, reference numeral 49 denotes a base of a holding unit 14. A rotating member 53 and a rotating member 55 integral with a pulley 54 are rotatably mounted on support plates 50 and 51 through bearings, respectively. Through holes 56 are formed in the rotating members 53 and 55, respectively. Hydropneumatic cylinders C3 having return springs are mounted at predetermined positions of each of the rotating members 53 and 55. Connecting hoses 57 of the cylinders C3 are connected to the through holes 56. Upon actuation of the cylinders C3, clamping members 59 mounted at the distal ends of piston rods 58 of the cylinders C3 clamp a potato 31 as a tuber.

Figure 7:
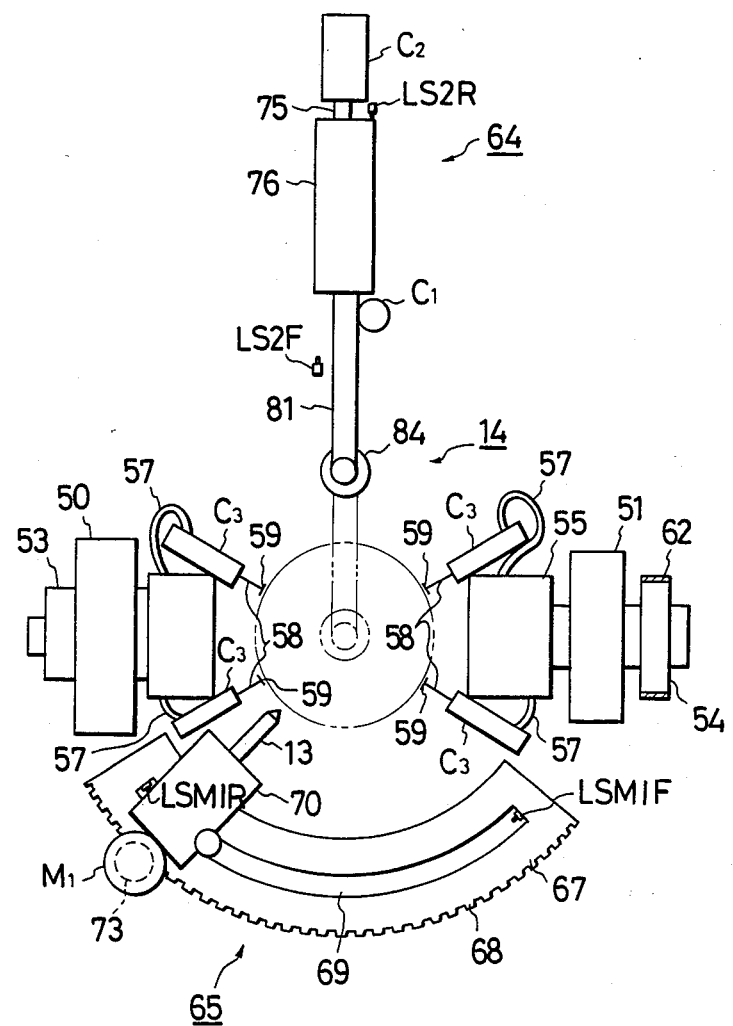
FIG. 7 is a plan view of the holding unit shown in FIG. 6.

Reference symbol M0 denotes a tuber rotating stepping motor. A pulley 61 is mounted at the distal end of a motor shaft 60 of the stepping motor M0. A transmission belt 62 is looped between the pulley 61 and the pulley 54. Upon operation of the stepping motor M0, the potato 31 clamped by the clamping members 59 is rotated about the horizontal axis. The through holes 56 of the rotating members 53 and 55 are coupled to a selector valve K3 having a drain outlet through connecting pipes 63 and 63', respectively. The selector valve K3 is connected to a hydropneumatic pump (not shown). A solenoid SOL3 (FIG. 10) for supplying a compressed fluid or air to the connecting pipes 63 and 63' is connected to the selector valve K3. A limit switch LS3F (FIG. 10) is arranged to operate when the tuber is completely clamped. As shown in FIG. 7, a potato feeding unit 64 and a sprout drilling unit 65 are disposed at predetermined positions with respect to the holding unit 14.

Figure 8:
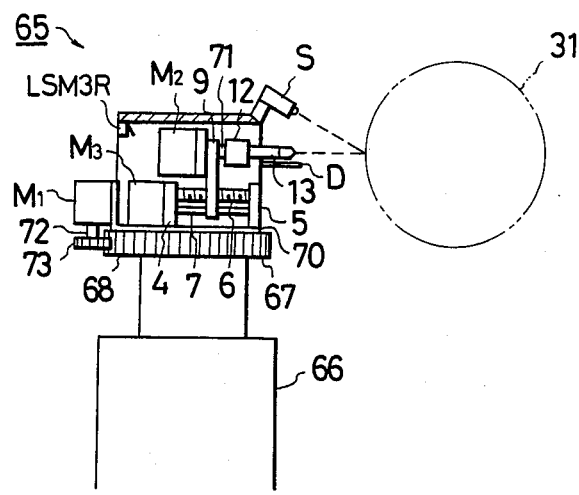
FIG. 8 is a partial sectional side view of a drilling unit of the holding unit shown in FIG. 6.

The drilling unit 65, shown in FIGS. 7 and 8, is of a transverse type, while the drilling unit shown in FIG. 5 is of a vertical type. As shown in FIGS. 7 and 8, an arcuated horizontal guide rail main body 67 is disposed on a base 66. An arcuated gear 68 is formed on the lower periphery of the guide rail main body 67 and an arcuated guide groove 69 is formed in the main body 67. A limit switch LSM1F is arranged at the forward end (one end of the guide groove 69) of a blade table 70, and a limit switch LSM1R is arranged at the rearward end (the other end of the guide groove 69) of the blade table 70.

The blade table 70, as shown in FIG. 8, is mounted on the guide rail main body 67. Supports 4 and 5 are mounted on the blade table 70 and are spaced apart from each other by a predetermined interval in the same manner as in FIG. 5. A screw rod 6 and a guide frame 7 are mounted between the supports 4 and 5 and are parallel to each other. A moving member feed motor M3 (like motor 43 in the embodiment shown in FIG. 5) for the screw rod 6 is mounted on the blade table. The lower portion of a moving member 9 is screwed around the screw rod 6 and the lowest portion of the moving member 9 is fitted around the guide frame 7. Feed motor M3 can rotate screw rod 6 in this embodiment so as to advance or retract moving member 9 guided along guide frame 7. It is at times convenient to regard motor M3 as if it is two motors on a common shaft: one acting as a feeding member advance motor M3F (forward), and the other as feeding member retrograde motor M3R (reverse). A blade rotating motor M2 is mounted at one side of the upper portion of the moving member 9. A limit switch LSM3R is arranged at the rearward end of a moving path of the moving member 9. A chuck 12 is mounted at the distal end of a motor shaft 71 of the blade rotating motor M2. A drill-like blade 13 is mounted on the chuck 12.

Reference symbol S (FIG. 8) denotes a photosensor arranged above the blade table 70 to detect sprouts of the potato 31; and reference symbol D denotes a cut amount detector arranged below the drill-like blade 13 to detect the cut depth of the drill-like blade 13. A limit switch LSM3F (FIG. 10) is arranged and operates when the drill-like blade 13 cuts into the potato 31 to the predetermined depth. Reference symbol M1 denotes a blade table moving motor for moving the blade table 70 on an arcuated path. The blade table moving motor M1 is mounted at the side wall of the blade table 70 and has a motor shaft 72. The motor shaft 72 has a gear 73 which meshes with the arcuated gear 68. The blade table 70 is moved very slowly along the surface of the potato 31 upon operation of the blade table moving motor M1 since the blade table 70 is guided along the guide groove 69.

Figure 9:
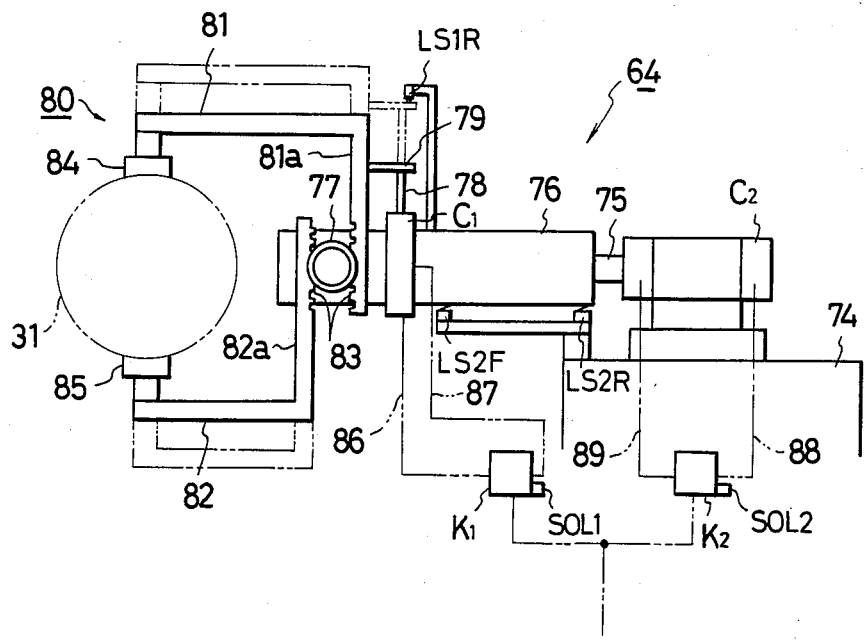
FIG. 9 is a side view of a feeding unit.

The feeding unit 64 will be described. As shown in FIG. 9, a feeding cylinder C2 is mounted on a base 74 to feed the potato 31 into the holding unit 14 shown in FIG. 6. A feeding member 76 is mounted at the distal end of a piston rod 75 of the feeding cylinder C2. A gear 77 is pivotally mounted near the distal end of the feeding member 76. A limit switch LS2F is arranged at the forward end of a moving path of the feeding member 76, and a limit switch LS2R is arranged at the rearward end thereof.

Reference symbol C1 (FIG. 9) denotes a clamping cylinder to clamp the potato 31. The clamping cylinder C1 is mounted vertically on one end of the feeding member 76. An operating plate 79 is integrally mounted with the distal end of a piston rod 78 of the clamping cylinder C1. A limit switch LS1F (FIG. 10) is arranged at an advance end of the piston rod 78 where the sprout of the potato 31 is completely routered. A limit switch LSIR is arranged at a retrograde end of the piston 78 where the blade is returned.

Reference numeral 80 (FIG. 9) denotes a clamping mechanism for vertically clamping the potato 31. The clamping mechanism 80 comprises L-shaped upper and lower arms 81 and 82. Vertical portions 81a and 82a of the upper and lower arms 81 and 82 have racks 83 which mesh with the gear 77, respectively. The operating plate 79 is fixed on the vertical portion 81a of the upper arm 81. Upper and lower clamping members 84 and 85 are mounted on the inner surfaces of the distal ends of the upper and lower arms 81 and 82, respectively. The upper clamping member 84 coaxially opposes the lower clamping member 85.

Connecting pipes 88 and 89 (FIG. 9) are connected to the feeding cylinder C2 through a selector valve K2. Connecting pipes 86 and 87 are connected to the clamping cylinder C1 through a selector valve K1. A hydropneumatic pump (not shown) is connected to the selector valves K1 and K2. A solenoid SOL1 is coupled to the selector valve K1 so as to supply a compressed fluid or air to the connecting pipes 86 and 87. A solenoid SOL2 is coupled to the selector valve K2 so as to supply a compressed fluid or sir to the connecting pipes 88 and 89.

Figure 10:
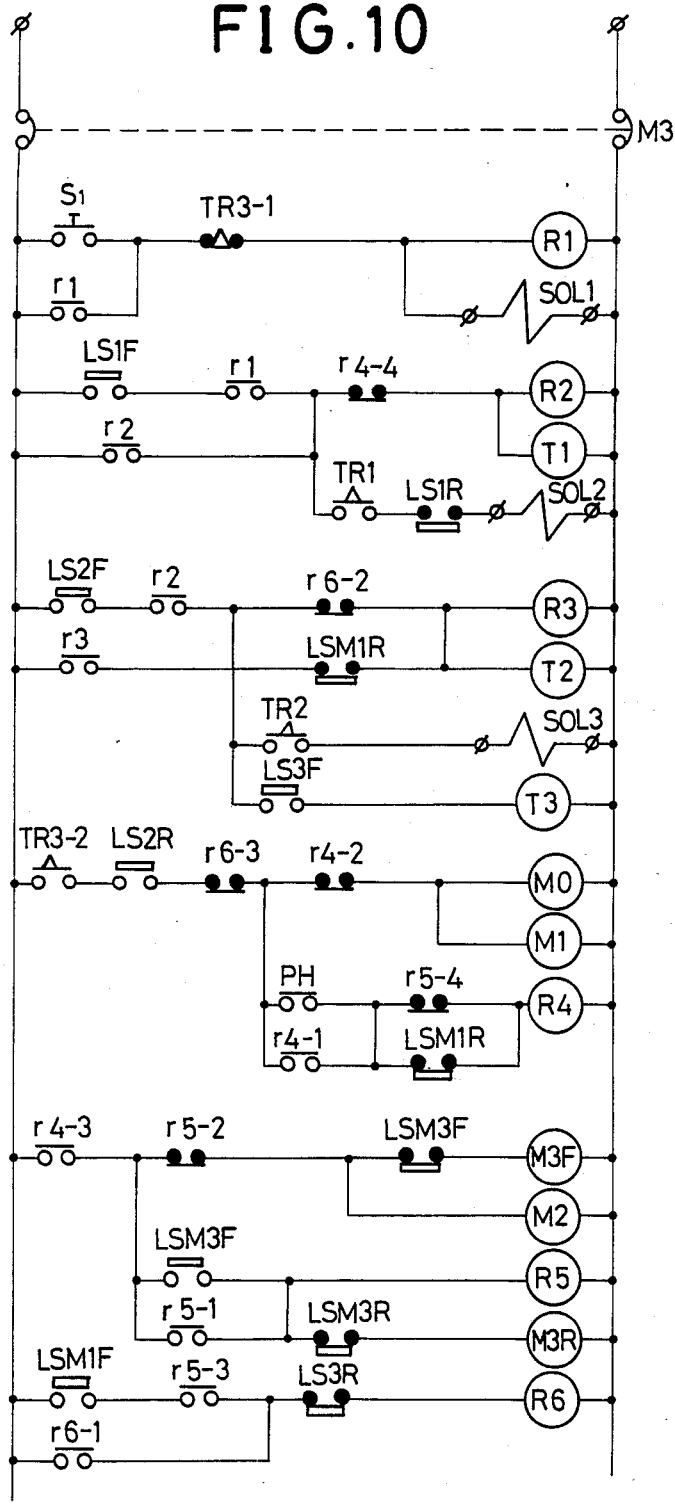
FIG. 10 shows an electrical circuit of the apparatus shown in FIG. 6.

FIG. 10 shows an electrical circuit of the third embodiment. Reference symbol SI denotes, a manual switch arranged at the selector valve K1. The manual switch S1 is connected in parallel with a relay contact r1 of a relay R1 for performing start holding. The manual switch S1 is connected to the relay R1 and the solenoid SOL1 of the selector valve K1 through a timer relay contact TR3-1 as the normally closed contact of a timer T3 for determining the clamping OFF timing.

The limit switch LS1F is operated upon completion of clamping of the tuber and is connected to a relay contact r4-4 as a normally closed contact of a relay R4 and a timer relay contact TR1 of a forward movement stabilizing timer T1 through the relay contact r1. The relay contact r4-4 is connected to the timer T1 and the relay R2. The timer relay contact TR1 is connected to the solenoid SOL2 of the selector valve K2 through the limit switch LS1R as the normally closed switch which is operated at the rearward end of the clamping movement of the tuber. The limit switch LS1F and the relay contact r1 are connected in parallel with a relay contact r2.

The limit switch LS2F is operated at the forward end of the moving path of the feeding member 76 and is connected through the relay contact r2 to a relay contact r6-2 as a normally closed contact, a timer relay contact TR2 of a timer T2 for determining a holding timing, and the limit switch LS3F operated at the end of clamping of the tuber. The relay contact r6-2 is connected to the timer T2 connected in series with a relay contact r3 of a relay R3 and the limit switch LSM1R as a normally closed switch operated when the blade table 70 reaches the rearward end. The timer relay contact TR2 is connected to a solenoid SOL3 of the selector valve K3, and the limit switch LS3F is connected to the timer T3 for determining the clamping OFF timing.

Reference symbol TR3-2 denotes a timer relay contact. The timer relay contact TR3-2 is connected to a relay contact r4-2 as a normally closed contact, a photosensor relay PH operated upon detection of a sprout by means of the photosensor S, and a relay contact r4-1 through the limit switch LS2R operated at the rearward end of the moving path of the feeding member 76 and a relay contact r6-3 as a normally closed contact. The photosensor relay PH is connected to a relay contact r5-4 as a normally closed contact and a relay R4. The relay contact r4-1 is connected to the relay R4 through the relay contact r5-4 and the limit switch LSM1R as a normally closed switch.

Reference symbol r4-3 denotes a relay contact which is turned on upon operation of the relay R4. The relay contact r4-3 is connected to a relay contact r5-2 as a normally closed contact, the limit switch LSM3F operated when the drill-like blade 13 has cut to the predetermined depth, and a relay contact r5-1. The relay contact r5-2 is connected to a feeding member advance motor M3F through the limit switch LSM3F and to the blade rotational motor M2. The limit switch LSM3F is connected to a relay R5 and a feeding member retrograde motor M3R through the limit switch LSM3R as a normally closed switch.

The limit switch LSM1F is operated when the blade table 70 is located at the forward end and is connected to a relay R6 through a relay contact r5-3 and a limit switch LS3R as a normally closed contact. The limit switch LSM1F and the relay contact r5-3 are connected in parallel with a relay r6-1.

The operation of the apparatus according to the third embodiment of the present invention will be described hereinafter. When the operator turns on the manual switch S1 for the selector valve K1, the start holding relay R1 and the solenoid SOL1 are actuated through the timer relay contact TR3-1 as a normally closed contact, so that the relay contact r1 is closed. The solenoid SOL1 is self-held, and the compressed fluid or air is supplied from the selector valve K1 to the clamping cylinder C1 through the connecting pipe 87. The piston rod 78 is thus moved downward, so that the rack 83 integrally formed on the vertical portion 81a of the upper arm 81 causes the gear 77 to rotate clockwise. The rack 83 formed at the vertical portion 82a of the lower arm 82 and meshing with the gear 77 is moved upward. The potato 31 is vertically clamped by the upper and lower clamping members 84 and 85.

When the potato 31 is completely clamped, the limit switch LS1F is turned on, and the relay contact r1 of the relay R1 is set in the ON position. The relay R2 and the timer T1 are operated through the relay contact r4-4 as a normally closed contact. The timer relay contact TR1 is turned on after a short period of time counted by the timer T1. The solenoid SOL2 is actuated to turn on the relay contact r2, and the solenoid SOL2 is self-held. A compressed fluid or air is supplied to the cylinder C2 through the connecting pipe 88 and the selector valve K2. The feeding member 76 at the distal end of the piston rod 75 is moved forward, and the clamping mechanism 80 is moved to the position of the holding unit 14.

When the limit switch LS2F is turned on at the forward end of the moving path of the feeding member 76, the relay contact r2 is turned on by the relay R2. The relay R3 and the timer T2 are actuated through the relay contact r6-2. The relay contact r3 is self-held by the timer T2. The timer relay contact TR2 is turned on after a short period of time counted by the timer T2. The solenoid SOL3 is then operated to supply the compressed fluid or air to the cylinders C3 through the connecting pipes 63 and 63' and the connecting hoses 57, so that the potato 31 is horizontally clamped by the clamping members 59 of the cylinders C3.

When the potato 31 is completely clamped, the limit switch LS3R and the timer T3 are sequentially turned on. Thereafter, when a predetermined period of time counted by the timer T3 has elapsed, the solenoid SOL1 is stopped since the timer relay contact TR3-1 is off. For this reason, the compressed fluid or air is supplied to the clamping cylinder C1 through the connecting pipe 86 and the selector valve K1. The piston rod 78 of the clamping cylinder C1 is moved upward, so that the upper clamping member 84 of the upper arm 81 and the lower clamping member 85 of the lower arm 82 are withdrawn to release the potato 31. The relay R1 is thus deenergized, and the relay contact r1 is set in the OFF position. The solenoid SOL2 is deenergized. The compressed fluid or air is supplied to the feeding cylinder C2 through the connecting pipe 89 and selector valve K2. Therefore, the feeding member 76 having the clamping mechanism 80 of the piston rod 75 is withdrawn to the initial position.

When a short period of time counted by the timer T3 has elapsed, the timer relay contact TR3-2 is set in the ON position. When the feeding member 76 returns to the initial position, the limit switch LS2R is turned on. The tuber rotating stepping motor M0 and the blade table moving motor (FIG. 6) are simultaneously started through the relay contacts r6-3 and r4-2 which serve as normally closed contacts. More specifically, when the tuber rotating stepping motor M0 is started, the pulley 61 mounted integrally with the motor shaft 60 is rotated, so that the rotational force of the pulley 61 is transmitted to the pulley 55 through the transmission belt 62. The rotating member 54 mounted integrally with the pulley 54 is rotated, so that the potato 31 horizontally clamped by the clamping members 59 of the cylinders C3 is rotated together with the rotating member 55 at a constant speed about the horizontal axis.

At the same time, the blade table moving motor (FIG. 7) is rotated in the forward direction, the gear 73 is rotated slowly, and the blade table 70 is moved very slowly along the arcuated gear 68 and the guide groove 69. The photosensor S (FIG. 8) mounted on the blade table 70 helically scans the surface of the potato 31 to detect a sprout.

When the photosensor S detects a sprout of the potato 31 rotating about the horizontal axis, the photosensor relay PH is energized, and the relay R4 is energized through the relay contact r5-4 as a normally closed contact. The relay contact r4-1 is self-held, and the relay contact r4-2 as another normally closed contact is deenergized. The tuber rotating stepping motor M0 and the blade table moving motor M1 (FIG. 8) are stopped. At the same time, the relay contact r4-3 is energized through the relay contact r5-2 as a normally closed contact. The blade rotating motor M2 and the feeding member advance motor M3F are started to rotate the drill-like blade 13, and the moving member 9 threadably engaging with the screw rod 6 is moved in the forward direction.

When the distal end of the drill-like blade 13 and the distal end of the cut amount detector D are substantially simultaneously brought into contact with the surface of the potato 31, the limit switch LSM3F is turned on when the drill-like blade 13 cuts the sprout to the predetermined depth, the limit switch LSM3F is operated to energize the relay R5, and the feeding member advance motor M3F is stopped. The relay R5 is self-held by the relay contact r5-1. The relay contact r5-2 as another normally closed contact is set in the OFF position, and then the blade rotating motor M2 is stopped. Upon operation of the relay contact r5-1, the feeding member retrograde motor M3R is rotated. As a result, the drill-like blade 13 is returned together with the moving member 9 to the initial position. When the drill-like blade 13 has reached the initial position, the limit switch LSM3R is turned off, and the feeding member retrograde motor M3R is also stopped. The limit switch LSM3F of the cut amount detector D is reset.

When the moving member 9 is returned to the initial position, the relay contact r4-2 is set in the ON position, and the tuber rotating stepping motor M0 and the blade table moving motor M1 are started again. While the moving member 9 is being moved toward the initial position, a potato portion from which a sprout is removed is not detected by the photosensor S to be a sprout. The photosensor relay PH is resent. The photosensor S detects another sprout of the potato 31 rotating about the horizontal axis. The same operation as described above is then repeated.

When the blade table 70 is moved along the arcuated gear 68 from the forward end corresponding to one end of the guide groove 69 upon operation of the blade table moving motor M1, the limit switch LSM1F is turned on, and the relay contact r5-3 is set in the ON position. The relay R6 is thus energized and is self-held by the relay contact r6-1. Simultaneously, the relay contact r6-2 causes the selector valve K3 to switch so as to discharge the fluid or air pressure from the cylinders C3 through the drain port. The piston rod 58 is withdrawn by the biasing force of the return spring. The potato 31 is thus released, and the rotational direction of the blade table moving motor M1 is reversed. When the blade table 70 is returned to the initial position, the limit switch LSM1R is turned off to deenergize the relay R4 and the motor M1.

The potato 31 is fed, in a charged position, by the feeding unit 64 to the holding unit 14. The drilling unit 65 continues routering of the sprouts.

The photosensor S is a chrominance sensor arranged to be interlocked with the drill-like blade 13 so as to detect a change in chrominance of light reflected by the surface of the potato. The photosensor S senses a black dot of a sprout of the potato 31 so as to bring the distal end of the drill-like blade 13 into contact with the sprout.

The routering amount with respect of the central portion of the sprout according to the present invention is compared with that according to the conventional method.

(1) Present Invention
Diameter d1 of cylindrical portion: 6 mm
Depth l of cylindrical portion: 10 mm
Since the shape of the routered recess has a cylindrical shape, the routered amount Q0 can be calculated as follows:

$$Q0 = \pi \cdot 3^2 \times 10 = 282 \text{ mm}^3$$

(2) Prior Art
Diameter D1 of bottom of conical portion: 20 mm
Depth l of conical portion: 10 mm
The routered amount Q1 can be calculated as follows:

$$Q1 = 10 \times (\pi \times 10^2)/3 = 1{,}047 \text{ mm}^3$$

When (1) is compared with (2), the ratio of Q1 to Q0 becomes 3.7:1 (1,047/282). The present invention can provide an efficient routering operation.

What is claimed is:

1. An apparatus for routering tuberous sprouts, said apparatus being provided with a drill-like blade having a distal end with a tapered portion and a blade rotating motor for rotating said drill-like blade, comprising:
   a drilling unit having a feeding unit for reciprocating said drill-like blade toward said sprouts;
   a holding member comprising a rotating member and a tuber motor, said rotating member having a hydropneumatic cylinder with clamping members for clamping a tuber, and said tuber motor being arranged to rotate said rotating member; and
   a photosensor provided in said drilling unit for transmitting a control signal to control said tuber motor and cooperatively rotate and move the drill-like blade of the drilling unit to router a sprout from said tuber.

2. An apparatus according to claim 1, wherein:
   said feeding unit comprises a screw rod with a screw rod motor and a moving member which is threadably engaged with said screw rod and which is mounted with said drill-like blade.

3. An apparatus according to claim 1, wherein:
   said drilling unit comprises an arcuated guide rail so as to cause said drill-like blade to controllably move along a surface of said tuber.

4. An apparatus according to claim 3, wherein:
   said drilling unit comprises a feeding unit motor for moving said feeding unit along said guide rail.

5. An apparatus according to claim 4, wherein:
   said guide rail has a switch at an end thereof.

6. An apparatus according to claim 1, wherein:
   said drilling unit comprises a cut amount detector.

7. An apparatus according to claim 6, wherein:
   said cut amount detector is electrically connected to said blade rotating motor of said feeding unit such that said blade rotating motor is rotated in the reverse direction in response to a detection signal from said cut amount detector.

8. An apparatus for routering tuberous sprouts, comprising:
   a movable sprout cutting blade comprising a sharp edge at a distal end of a cutter;
   blade-moving means for moving said blade, comprising a power-driven chuck to hold said cutter;
   reciprocating support means for controllably supporting said blade-moving means to provide controlled reciprocal movement thereof in a selected direction, comprising a rotatable threaded rod, a guide rod parallel to said threaded rod, a threaded boss threaded onto said threaded rod to move axially thereof upon rotation of said threaded rod within, a platform attached to said threaded boss while slidably guided by said guide rod, motor means engaged to said threaded rod for controllably and reversibly rotating said threaded rod between predetermined limits, and control means for controlling the direction, speed and extent of motion of said motor means;
   rotatable support means for supporting said reciprocating support means so as to allow controlled rotation thereof along a curved arcuate path about a predetermined center of rotation;
   tuber support means for controllably supporting said tuber in a predetermined juxtaposition with respect to said moving sprout cutting blade for removal of tuberous sprouts thereby, comprising rotatable clamp means for clamping said tuber in a predetermined position and fluid pressure actuated clamp application means for applying said clamp means to said tuber;
   sprout detector means for detecting a sprout on said tuber supported by said tuber support means; and
   first control means for cooperatively controlling said blade-moving means, said reciprocating support means and said rotational support means to controllably router said detected sprout from said tuber.

9. An apparatus as claimed in claim 8, wherein:
   said sprout detector means comprises a photosensor.

10. An apparatus as claimed in claim 9, further comprising:
    cut amount sensor means, cooperating with said moving blade and said reciprocating support means, for sensing the depth of a cut made by said moving blade into said tuber while routering said sprout therefrom; and
    second control means, cooperating with said first control means, for limiting the depth of said cut to a predetermined value.

11. An apparatus as claimed in claim 10, further comprising:
    third control means, cooperating with said first and said second control means respectively, for controlling said tuber support means to periodically reposition said tuber supported thereby until all sprouts thereon are removed.

12. An apparatus as claimed in claim 11, further comprising:
    tuber feeding means for feeding a succession of said tubers, for removal of said sprouts therefrom, to said tuber support means; and
    fourth control means, cooperating with said first, second and third control means respectively, for controlling said tuber feeding means to feed said tubers thereby at a predetermined rate.

* * * * *